United States Patent
Wieltsch et al.

(10) Patent No.: US 12,502,691 B2
(45) Date of Patent: Dec. 23, 2025

(54) COOLING VIBRATION EXCITER APPARATUS

(71) Applicant: SANDVIK ROCK PROCESSING AUSTRALIA PTY LIMITED, New South Wales (AU)

(72) Inventors: Andreas Wieltsch, New South Wales (AU); Simon Mann, New South Wales (AU)

(73) Assignee: Sandvik Rock Processing Australia Pty Limited, New South Wales (AU)

( * ) Notice: Subject to any disclaimer, the term of this patent is extended or adjusted under 35 U.S.C. 154(b) by 65 days.

(21) Appl. No.: 18/694,401

(22) PCT Filed: Sep. 21, 2022

(86) PCT No.: PCT/AU2022/051140
§ 371 (c)(1),
(2) Date: Mar. 21, 2024

(87) PCT Pub. No.: WO2023/044534
PCT Pub. Date: Mar. 30, 2023

(65) Prior Publication Data
US 2024/0390941 A1 Nov. 28, 2024

(30) Foreign Application Priority Data
Sep. 22, 2021 (AU) ................................ 2021903046

(51) Int. Cl.
*B06B 1/16* (2006.01)
*B65G 27/16* (2006.01)
(Continued)

(52) U.S. Cl.
CPC ................ *B06B 1/167* (2013.01); *B06B 1/16* (2013.01); *B65G 27/16* (2013.01); *F16C 23/06* (2013.01);
(Continued)

(58) Field of Classification Search
CPC ........... B06B 1/16; B06B 1/162; B06B 1/167; B65G 27/16; B65G 27/20; B65G 27/32;
(Continued)

(56) References Cited

U.S. PATENT DOCUMENTS

| | | | |
|---|---|---|---|
| 4,928,551 A | 5/1990 | Connelly et al. | |
| 11,623,249 B2 * | 4/2023 | Kato | B07B 1/44 209/326 |

(Continued)

FOREIGN PATENT DOCUMENTS

| | | |
|---|---|---|
| AU | 2014201607 B2 | 10/2015 |
| CN | 201618682 U | 11/2010 |

(Continued)

OTHER PUBLICATIONS

JP-2748708 (Year: 1998).*

(Continued)

*Primary Examiner* — Terence Boes
(74) *Attorney, Agent, or Firm* — Corinne R. Gorski

(57) ABSTRACT

An exciter apparatus includes an exciter housing and at least one bearing means supporting at least one driven shaft carrying eccentric mass means. The exciter housing includes an array of bore passages extending from an upper wall of the exciter housing to a lower wall of the exciter housing. A mounting structure plate is securable to mineral processing or handling equipment intended to be vibrated by the exciter apparatus. The mounting structure plate has an array of fastener receiving zones, whereby elongated fastener means can pass through the bore passages from the upper wall to be engaged in the fastener receiving zones. The exciter apparatus further includes a pair of bearing members supporting a pair of driven shafts having intermeshing gears. Each of the bearing members and intermeshing gears have individual liquid lubrication sump zones separate from one another, (Continued)

and cooling means for cooling moving parts of the exciter apparatus.

23 Claims, 13 Drawing Sheets

(51) Int. Cl.
| | |
|---|---|
| *F16C 23/06* | (2006.01) |
| *F16C 33/66* | (2006.01) |
| *F16H 57/02* | (2012.01) |
| *F16H 57/021* | (2012.01) |
| *F16H 57/04* | (2010.01) |
| *H02K 7/06* | (2006.01) |
| *H02K 7/08* | (2006.01) |
| *H02K 7/116* | (2006.01) |

(52) U.S. Cl.
CPC ....... *F16C 33/6659* (2013.01); *F16H 57/021* (2013.01); *F16H 57/0404* (2013.01); *F16H 57/0416* (2013.01); *F16H 57/0417* (2013.01); *F16H 57/0449* (2013.01); *F16H 57/045* (2013.01); *F16H 57/0457* (2013.01); *F16H 57/0471* (2013.01); *F16H 57/0495* (2013.01); *H02K 7/061* (2013.01); *H02K 7/08* (2013.01); *H02K 7/116* (2013.01); *F16C 2300/28* (2013.01); *F16H 2057/02073* (2013.01)

(58) Field of Classification Search
CPC .. F16C 23/06; F16C 33/6659; F16C 33/6677; F16H 57/021; F16H 57/0404; F16H 57/0416; F16H 57/0417; F16H 57/0449; F16H 57/045; F16H 57/0457; F16H 57/0471; F16H 57/0495; F16H 57/0453; F16H 57/0452; F16H 2057/02073; H02K 7/061; H02K 7/08; H02K 7/116; H02K 7/20; H02K 7/065; H02K 7/063; H02K 5/20; H02K 9/06; H02K 9/08; H02K 9/19; F16N 7/26

See application file for complete search history.

(56) References Cited

U.S. PATENT DOCUMENTS

| | | |
|---|---|---|
| 2004/0045877 A1 | 3/2004 | Rubie et al. |
| 2014/0190791 A1 | 7/2014 | Kimura et al. |
| 2014/0341675 A1 | 11/2014 | Dobbin |
| 2017/0066017 A1 | 3/2017 | Ashley et al. |
| 2018/0128154 A1 | 5/2018 | Heeszel et al. |
| 2019/0323546 A1 | 10/2019 | Stevens et al. |
| 2020/0049188 A1 | 2/2020 | Rawdon et al. |

FOREIGN PATENT DOCUMENTS

| | | | | |
|---|---|---|---|---|
| CN | 109127345 | A | 1/2019 | |
| CN | 211202567 | U | 8/2020 | |
| CN | 112610871 | A | 4/2021 | |
| EP | 0841264 | B1 | 2/2001 | |
| EP | 3171042 | A1 | 5/2017 | |
| FR | 2529292 | A1 | 12/1983 | |
| GB | 547076 | A | 8/1942 | |
| JP | 2748708 | B2 * | 5/1998 | .......... F16C 2380/26 |
| WO | 2015084467 | A2 | 6/2015 | |
| WO | 2017016665 | A1 | 2/2017 | |

OTHER PUBLICATIONS

"Five Ways to Keep Roller Bearings Cool", MachineDesign, Jul. 13, 2016, [retrieved from internet on Nov. 2, 2022] Retrieved from https://www.machinedesign.com/mechanical-motion-systems/bearings/article/21 82080/five-ways-to-keep-roller-bearings-cool.

"Lubrication of Roller Bearings," Schaeffler Technologies, published Mar. 2013. [retrieved from internet on Nov. 2, 2022] Retrieved from https://www.schaeffler.com/remotemedien/media/shared media/08 media library/01 publications/schaeffler 2/tpi/downloads 8/tpi176 de en.pdf.

* cited by examiner

COOLING VIBRATION EXCITER APPARATUS

RELATED APPLICATION DATA

This application is a § 371 National Stage Application of PCT International Application No. PCT/AU2022/0511140 filed Sep. 21, 2022, claiming priority to AU 2021903046 filed Sep. 22, 2021. This application is related to co-pending U.S. patent application Ser. No. 18/694,391, filed on Mar. 21, 2024 and Ser. No. 18/694,403 filed on Mar. 21, 2024.

FIELD OF THE INVENTION

This disclosure relates to vibration exciter apparatus and parts thereof, the exciter apparatus, either alone or in combination with other similar devices, being intended to impose a vibration regime to mineral processing or handling equipment during use of such equipment. While mineral processing or handling applications such as mining ore, coal and quarrying activities are relevant, other comparable applications are possible and are also applicable to this development.

BACKGROUND OF THE INVENTION

Exciter apparatus for imposing a vibration regime to mineral processing or handling equipment of various designs and configurations are known. One such apparatus is a series of exciters identified by reference serial numbers DF6xx provided by "Schenck Process". Similar exciter apparatus is also provided by various other entities. Typical features of DF6xx series exciter apparatus are illustrated in FIGS. 1 to 4 annexed hereto and are described in greater detail in the following text. The exciter prior art apparatus 10 includes a cast exciter housing 11 with opposed side walls 12, 13, opposed end walls 14, 15, and a closed base wall. The upper face of the cast exciter housing 11 is substantially open with a surrounding seal flange 16, the upper face being closed when assembled by a top wall plate 17, a seal gasket 18 and a plurality of fasteners 19. Each of the side walls 12, 13 have adjacent openings 20, 21 to allow a long driven shaft 22 and a short driven shaft 23 to project there through in the assembled structure (FIG. 1). In this assembled structure, the outer ends of the shafts 22, 23 carry eccentric masses 24 with the arrangement of the masses 24 being overlapping as shown in FIG. 1. Each of the openings 20, 21 in the side walls 12, 13 are closed in the assembled structure (FIG. 1) by closure plates 25, 26 that are sealed to the side walls 12, 13 and include seals that seal on the driven shafts 22, 23. The driven shafts 22, 23 are carried by bearings 27 which typically are a pair of spherical roller bearings (SRB) positioned on each shaft 22, 23. As shown in FIG. 4, a pair of intermeshing gears 28 are mounted on each driven shaft 22, 23 where the intermeshing gears 28 are axially positioned between the bearings 27 on each driven shaft 22 or 23. The interior of the exciter housing 11, in its lower regions, provides a liquid lubricant zone or sump 29 with the liquid lubricant being introduced through an upper inlet opening 30 and drained through a lower drain opening 31 when required. When in use, the inlet opening 30 and lower drain opening 31 are closed by removable plugs or stopper members. Each of the four bearings 27 and the intermeshing gears 28 are intended to be splash lubricated from the lubricant in the common sump 29.

The exciter housing 11 has a lower outwardly extending flange 32 with a plurality of fastener (bolt) receiving bores 33 along their lengths to allow fastener bolts or the like to secure the exciter apparatus 10 to the desired position on processing or handling equipment, typically mineral processing or handling equipment. The outwardly extending flanges 32 may be strengthened or stiffened by vertical webs 34, however, such webs tend to make it difficult to rotate the fastener bolts (or similar) when installing or removing the exciter apparatus.

The driven shafts 22, 23, in use, are drivingly connected to a drive motor or motors to rotate the eccentric masses 24 to create the desired vibration regime. Various arrangements for achieving this are known including, but not limited to, a drive motor driving each shaft, a drive motor driving one shaft with rotation being drivingly transferred to the other shaft by gearing means including the inter meshing gears shown in FIG. 4. Exciter apparatus utilising one driven shaft or more than two driven shafts are known and some aspects of the developments disclosed in the following specification will be recognised as applying to such exciter apparatus. Drive arrangements for the or each driven shaft are known and therefore are not further shown or described in the following.

Several other published prior art references are briefly discussed in the following. Chinese patent specification no CN112610871A has a housing constructed similarly to that described above in relation to the DF6xx series exciter housing except that the bearings supporting the driven shafts are not lubricated by splash lubrication from a sump containing liquid lubricant but rather a pump and delivery passages delivering liquid lubricant to the bearings, presumably to try to improve bearing lubrication. The specification discloses intermeshing gears only one of which is drivingly carried by one of the driven shafts with the other directly driving the aforesaid pump. Intermeshing gears carried by both driven shafts are not shown. Australian Patent Specification No 2014201607A1 discloses exciter apparatus having a casing or housing similarly constructed to the above described DF6xx series exciter apparatus except that it positively defines that no intermeshing gearing mounted from the driven shafts are shown or intended to be used. The internal space of the housing does have two separate liquid lubricant sump zones for the respective shaft bearings formed by an intermediary wall.

Furthermore, the above discussed vibration exciters and similarly constructed exciters utilising intermeshing gear arrangements are typically mounted to mineral processing or handling equipment such as vibrating screening apparatus for separating mined ore material into sized particle ranges and feeders therefore in a variety of positions and angles of inclination including upstanding and underslung positions. These exciters typically use a splash lubrication system utilising at least one of the gears splashing or spraying enough lubricating liquid from a single sump contained within the exciter housing onto the various moving parts including the bearings and the other intermeshing gear themselves. This has worked to some degree, however, there are believed to be some shortcomings with these existing arrangements. Specifically, at start up, and with some viscosity characteristics of the lubricating liquid, there may not be sufficient lubricating liquid getting operationally to the bearings and particularly the bearing(s) located furthest from the liquid lubricant bath. It may, for example, be desirable to have different lubricating characteristics for the bearings compared to the gears, particularly at start up, but this is not possible with a single sump exciter housing that must provide the same lubricating liquid for the bearings and the gears. It is also believed that particle debris is created by use of these vibration exciters over time and this may originate to a greater extent from the intermeshing gears rather than the bearings. This particle debris is likely to be moved around within single sump vibration exciters to be to be directed into moving part zones of the bearings.

It is of course desirable for vibration exciter apparatus to be effective in operation for the longest possible time periods between maintenance stages. Liquid lubricants used in such vibration exciter apparatus does degrade over time with some of the main factors effecting such degradation being high operational temperatures and build up of the aforesaid debris particles such as wear particles and the ingress of particles from the outside environment when the vibration processing or handling equipment is used in harsh environments. Seals are used in current vibration exciter apparatus but regardless, particle debris still builds up in liquid lubricant sump zones and can be fed, in use, back into moving part operational zones. Current vibration exciter apparatus (e.g. DF6xx series of Schenck Process) and other similar apparatus rely exclusively on natural convective cooling from external surfaces of the exciter apparatus for any cooling of the apparatus or parts of same. This results in relatively high operating temperatures, particularly around the bearings. These high temperatures result in the condition of the liquid lubricant deteriorating relatively quickly. The high temperatures also limit the life of elastomeric seals such as lip or V-ring seals. Current exciter apparatus commonly utilise felt seals, particularly to seal rotating shafts, however these seal types are not fully airtight and may allow leakage or ingress of damaging debris particles or water which can accumulate over time. Generally it would be desirable to use elastomeric sealing members but to do so, operating temperatures need to be significantly reduced. In this regard, relying on current convective cooling effects would not be sufficient.

Vibration exciter apparatus normally operate in relatively harsh environments and while the internal zones are sealed, at least to some extent, it is possible for small amounts of externally originating particle debris or water to enter the internal spaces. Moreover, the harsh operating characteristics of exciter apparatus does cause metal wear particles to be formed over a period of use which also collect in internal zones. Such particle material can have significant adverse life effects on the internal moving parts and particularly the bearings. Exciter apparatus of the aforedescribed type have generally become larger over time producing higher magnitudes of force, and as a result, they tend to run hotter due to higher friction associated with larger bearings being used. This circumstance provides significant complications for selecting a lubricating liquid with a suitable viscosity characteristic, that is, low enough at start up but high enough to provide adequate lubrication and resistance against contaminants during normal or continuous operation. Moreover, if during a maintenance stage, lubricating liquid is introduced with incorrect lubricating characteristics, then this can have a significant adverse effect on operational life. Further, known vibration exciter apparatus either have no live (that is, during operation) method of sensing lubrication liquid levels in lubricating liquid sumps, or have basic lubricating liquid level sensing methods such as the use of dipsticks that are operational only when the vibration exciter apparatus is not in operational use. Still further, such liquid level sensing methods that do exist, can be affected by issues associated with installation configurations of such vibration exciter apparatus.

Some of the foregoing factors and others have resulted in exciter apparatus, particularly those used in harsh environments such as mine sites and the like, to ideally require relatively short period maintenance operations to be carried out on site by available site based maintenance personnel. At the same time, mine operators have been moving away from employing site-based maintenance employees for carrying out such maintenance operations. Moreover, regular relatively short period onsite maintenance operations tend to provide unwanted and non-productive shutdown, or at least partial shutdown of potentially high income earning activities which is generally not desired. It is therefore recognised that longer periods between requiring any maintenance activities would be desirable, and particularly, it would be desirable to have a bolt in, bolt out replacement process whereby maintenance and/or renovation of such exciter apparatus might occur offsite by personnel experienced in such specialised activities.

BRIEF SUMMARY OF THE INVENTION

An objective of the present development is to provide improvements in exciter apparatus, or in parts thereof, that will enable an improvement in periods between which regular maintenance activities might be carried out. A preferred related objective is to provide improvements in operational parts of vibration exciter apparatus that will enable effective removal of operationally generated heat affecting liquid lubricant degradation from operational parts of such vibration exciter apparatus. The aim of this development being to extend operational use periods between down times for maintenance. The aim is to apply these improvements to any existing vibration exciter apparatus as well as any newly developed vibration exciter apparatus as disclosed herein or elsewhere.

The vibration exciter apparatus may be configured, in use, to impose a vibration regime to vibration processing or handling equipment, said vibration exciter apparatus including an exciter housing, at least one bearing means, the or each said bearing means being operationally mounted in an internal zone of said exciter housing to be, in use, in/at least partial contact with liquid lubricant in a liquid lubricant sump zone with said bearing means being lubricated by liquid lubricant from the liquid lubricant sump zone, the or each said bearing means supporting a driven shaft carrying eccentric mass means externally of said exciter housing, said vibration exciter apparatus including cooling means to receive heat from the or at least one said bearing means and/or said liquid lubricant in said liquid lubricant sump zone and to convey said heat at least partially to a position externally of said exciter housing. Conveniently the cooling means is positioned to receive heat from each said bearing means.

Providing cooling means as described in the proceeding paragraph enables heat to be moved from internal heat generation zones to an external zone where it is more readily dissipated by convention processes or by other convenient means.

In a preferred aspect, the cooling means may include a first heat receptor means positioned adjacent the or each said bearing means to, in use, receive heat from the or each said bearing means, and at least one heat flow path extending from the or each said first heat receptor means to a position externally of said exciter housing whereby heat flows along the or each said heat flow path to said position externally of said exciter housing. The aforesaid cooling means may be at least partially located within the or each said driven shaft.

In one particular exciter apparatus construction, the or each said bearing means may include a first bearing member and a second bearing member positioned axially spaced along a said driven shaft. The cooling means may include one said first heat receptor means positioned adjacent a said bearing means with the heat flow path including a first section extending from the first heat receptor means towards a first end zone of the driven shaft, said cooling means further including a second said first heat receptor means positioned adjacent said bearing means with the heat flow path including a second section extending from the second heat receptor means towards a second end zone of the driven shaft.

In one possible variation, the first heat receptor means and the second heat receptor means may be formed as part of a single structure. Alternatively they may be formed as separate structures.

In further exciter apparatus configuration, the exciter apparatus may include two spaced said driven shafts, each being supported by a said bearing means. Each of the aforesaid bearing means may be positioned in a separate said liquid lubricant sump means located within the internal zone of said exciter housing.

As a further possible variation, the exciter apparatus may have cooling means that has a second cooling means section that is in addition to the above described aspects or alternatively comprises a sole part of the cooling means, the second cooling means section being positioned in a wall section of the exciter housing with at least a first portion of said second cooling means section positioned adjacent the or each said liquid lubricant sump zone, whereby said first portion absorbs heat from said adjacent liquid lubricant sump zone and said second cooling means section transfers at least a portion of said absorbed heat to a position external of said exciter housing.

Advantageously, the cooling means includes one or more heat pipes. The term "heat pipe" is used throughout this specification to denote a heat transport system typically consisting of a pipe constructed from a heat conductive metal such as copper that is closed at both ends and contains a wick structure (e.g. powder sintered copper) together with a liquid (including water) that is capable of absorbing heat to evaporate and condense again when it has moved to a cooler zone of the heat pipe. The evaporating and condensing of the liquid produce a form of pumping action in the heat pipe to cause movement along the heat pipe and thereby move heat from one end of the pipe and effectively to the other. Heat pipes do not, in themselves, dissipate heat but rather absorb heat at one end and lose heat at the other end if it is located in a cooler zone.

In a possible alternative to using heat pipes, the cooling means may include one or more heat flow passage means configured to receive heat from said bearing means and to transfer said received heat to a position externally of said exciter housing by passing a cooling gas or fluid flow through said heat flow passage means. The aforesaid heat flow passage means could be located in one or more driven shafts or in wall zones of the exciter housing adjacent the or each liquid lubricant sump means.

In a still further possible alternative, the cooling means may consist of or include heat conductor elements embedded in either or both said driven shafts, or a wall section of the exciter housing either adjacent the or each said bearing means or adjacent the liquid lubricant in the liquid lubricant sump zone(s). Such heat conductor elements may be heat conductor metal material such as copper and be positioned to accept heat at a generation point in the vibration exciter apparatus and to conduct some to an external position for dissipation. In a preferred embodiment, fan means might be utilised to dissipate heat from the external position. The fan means might be carried by at least one said driven shaft.

The present development also proposes using for the cooling means, at least one cooling means assembly comprising, a first heat receptor part and a first heat dissipater part spaced from one another and connected by one or more heat pipes, the or each said heat pipe being connected to the first heat receptor part and to the first heat dissipater part such that heat is transferrable from the first heat receptor part to the or each said heat pipe and from the or each said heat pipe to the first heat dissipater part, said cooling means assembly being positioned in passage means formed in a said driven shaft wherein the first heat dissipater part is positioned externally of said exciter housing. Preferably the first heat receptor part is positioned adjacent a said bearing means. Preferably the or each said cooling means assembly includes a said first heat receptor part positioned within said passage means and a pair of said first heat dissipater parts each being located in said passage means and spaced from said first heat receptor part on opposite sides thereof, each of said first heat dissipater parts being connected by at least one said heat pipe to said first heat receptor part. In one possibility two said cooling means assembles are provided in each said passage means. The or each of the aforesaid cooling means assembly or assembles may include multiple said heat pipes.

In a further aspect of this development, an objective is to ensure adequate lubrication gets to moving parts requiring lubrication within the vibration exciter housing internal zone by splash lubrication methods from a liquid lubricant sump zone.

In this regard, this development provides a vibration exciter apparatus configured, in use, to impose a vibration regime to vibration processing or handling equipment, said vibration exciter apparatus and exciter housing, at least one bearing means positioned in said exciter housing, the or each said bearing means supporting a driven shaft carrying eccentric mass means externally of the exciter housing, and the or each said bearing means being positioned in an individual liquid lubricant sump zone containing, in use, a liquid lubricant sump pool. Preferably, first and second said bearing means are provided each supporting a said driven shaft whereby the driven shafts are adjacent one another and parallel to one another with the first bearing means being located in a first said liquid lubricant sump zone separate from a second said liquid lubricant sump zone in which said second bearing means is located, said second liquid lubricant zone containing a said liquid lubricant sump pool separate from the liquid lubricant sump pool in said first liquid lubricant sump zone. Preferably, each said driven shaft carries a gear with said gears intermeshing with one another and being located in a third liquid lubricant sump zone containing a third liquid lubricant pool in use. Preferably a drain outlet leads from each said individual liquid lubricant sump zone through an elongated drain passage to an external discharge point. Conveniently, the or each said individual lubricant sump zone has an enlarged particulate debris collection zone forming part of the individual lubricant sump zone and communicating with said drain outlet whereby particulate debris formed is collectable in said debris collection zone and eventually flushed out through the drain passage. In this manner such debris may settle in a position where it will not be moved into moving parts intended to be lubricated by the liquid lubricant. Conveniently, the enlarged particulate debris collection zone may also include trap means arranged to permit particulate debris to pass into the enlarged zone but restrict its movement back into the main sump zone. The trap means may be perforated walls or partial walls surrounding the enlarged particulate debris collection zone. Providing operation of separate bearing means in separate liquid lubrication sumps still, in itself and separate from the means, provide a lowering of operating temperatures. This effect is also achieved with a separate liquid lubrication sump for the intermeshing gears. Moreover separating the intermeshing gears from the bearing sumps prioritizes particles debris from the gears adversely affecting the bearing means.

Enabling cooling of the liquid lubricant and potentially the moving parts such as the bearing means and the intermeshing gears will enable longer periods of use of vibration exciter apparatus between down times for maintenance activities. This, together with other features and aspects of this development, are expected to provide an ability to enable remove a vibration exciter apparatus and simply replace the vibration exciter apparatus with an equivalent unit thereby minimizing down time of the vibration processing or handling equipment.

Reference is made in the disclosure of this specification to vibration exciter apparatus, either alone or with other similar devices or equipment being mountable to vibration processing or handling equipment to impose a vibration regime thereto during the use of same. Such processing or handling equipment is primarily intended for use in the mineral processing or handling industries such as mining ore or coal, or quarrying other rock or earth based materials, however, such references are not intended to be limited thereto as the developments disclosed herein are equally applicable to any industry where a vibration regime is required to be imposed.

A number of aspects are disclosed herein in relation to achieving a certain result. It will be recognised by those skilled in the art that a feature disclosed in respect of one aspect may be utilised in any other aspect. Furthermore, some aspects could also be applied to the illustrated prior art design as well as other prior art designs. Moreover it should also be understood that any terms, if used, such as "comprises", "comprising", "includes, "including", "haves", and/ or "having", specify the presence of stated features, items, steps, operations, elements, materials and/or components, but do not preclude the presence of, or addition of, one or more other features, items, steps, operations, elements, components, materials and/or groups thereof. The disclosure of this specification should also be regarded as including the subject matter of the claims as annexed. The annexed drawings represent, in FIGS. 1 to 4 a prior art design and in the other drawings various preferred features of a new design development.

DETAILED DESCRIPTION OF PREFERRED EMBODIMENTS

Figure 1:
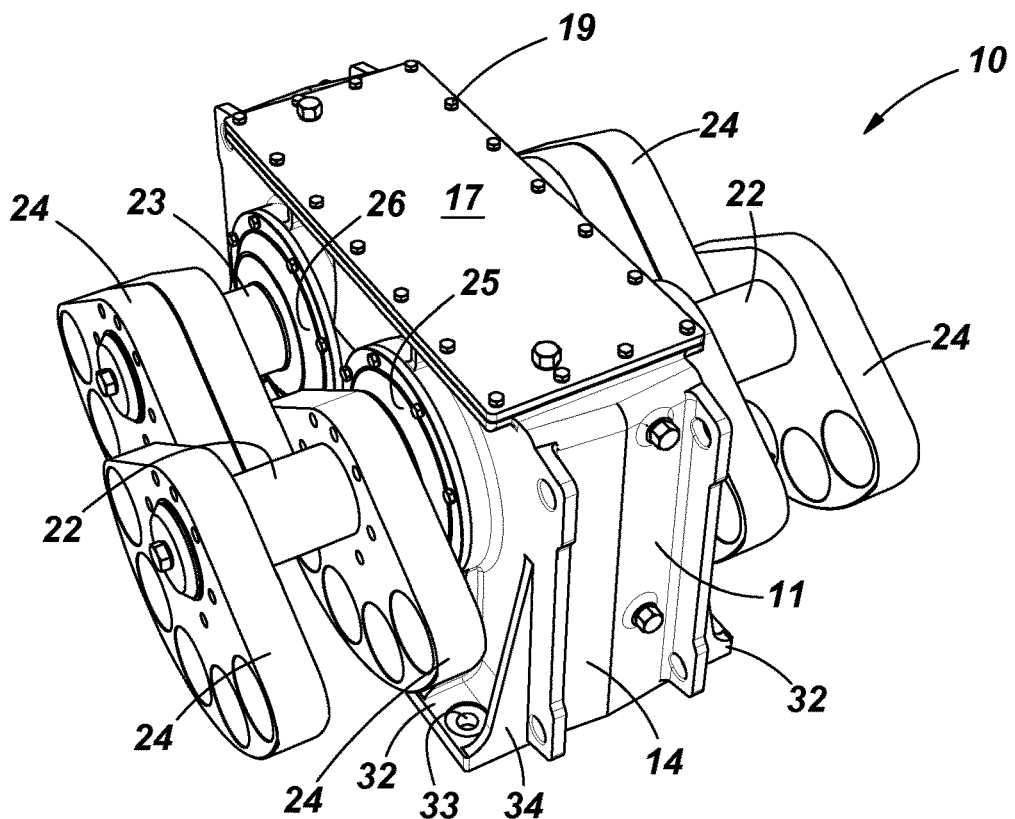
FIG. 1 is a perspective view of a DF6xx series prior art exciter apparatus.
Figure 2:
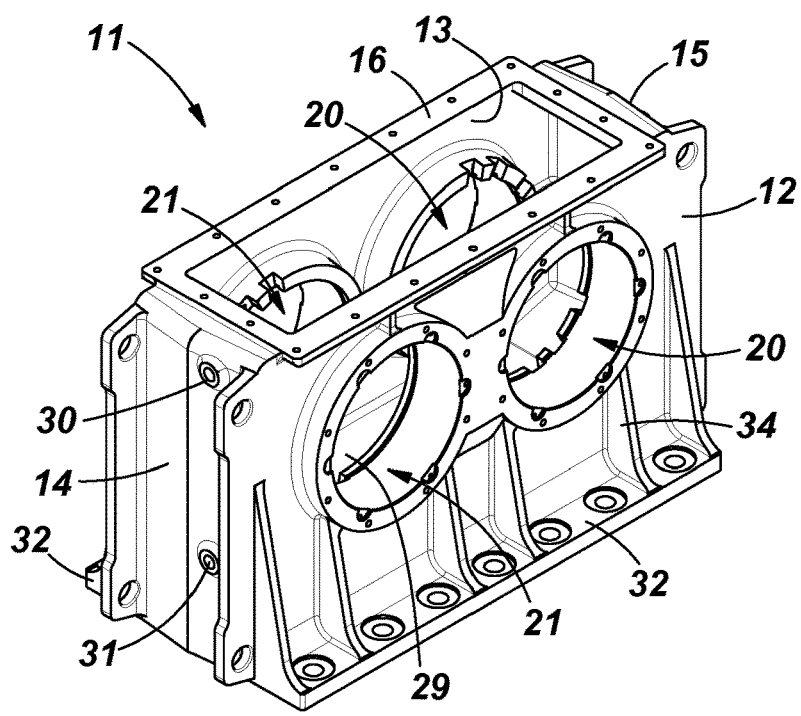
FIG. 2 is a perspective view of the exciter apparatus casing utilised in the exciter apparatus of FIG. 1.
Figure 3:
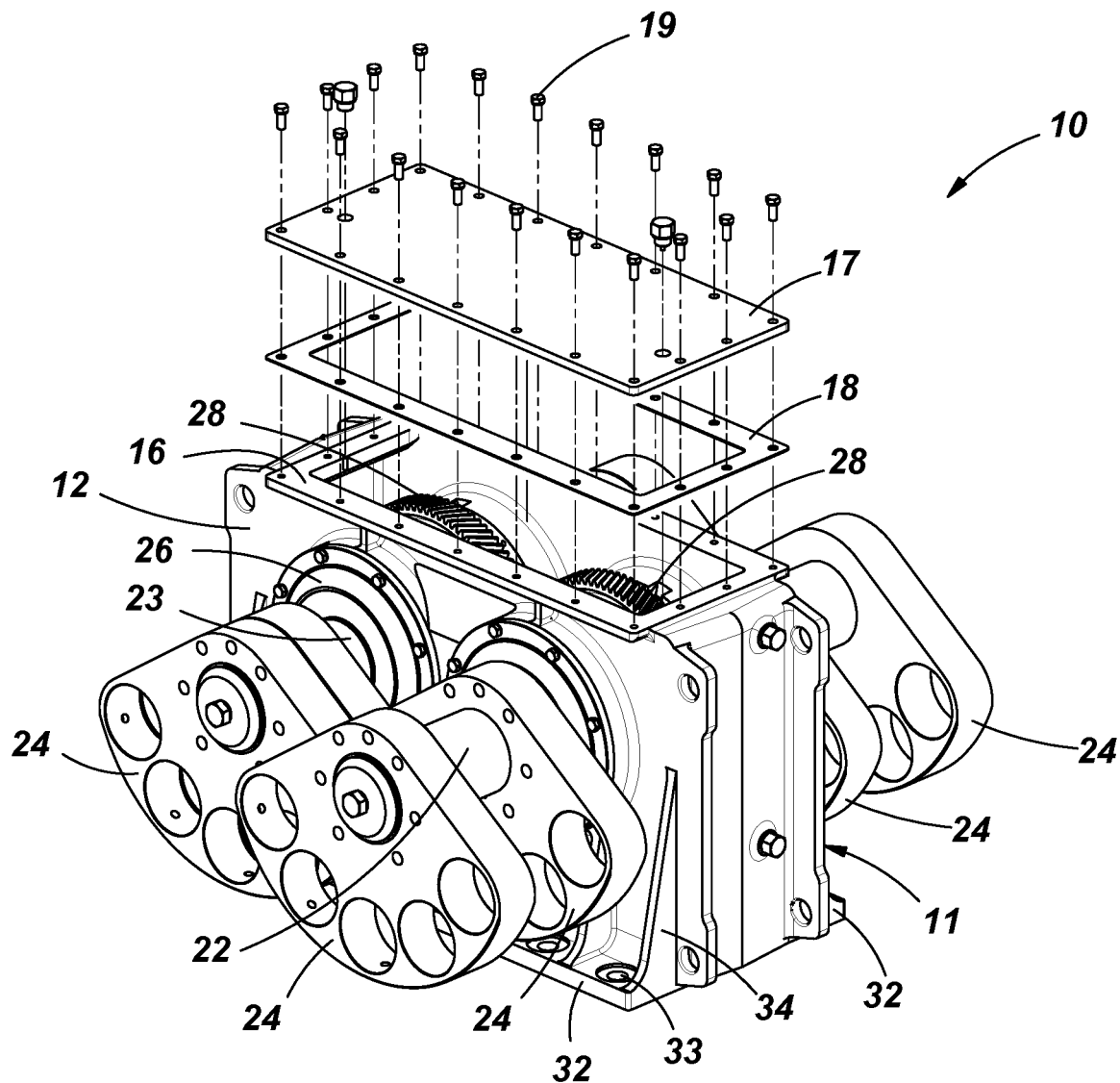
FIG. 3 is a partially exploded perspective view of the exciter apparatus shown in FIG. 1.
Figure 4:
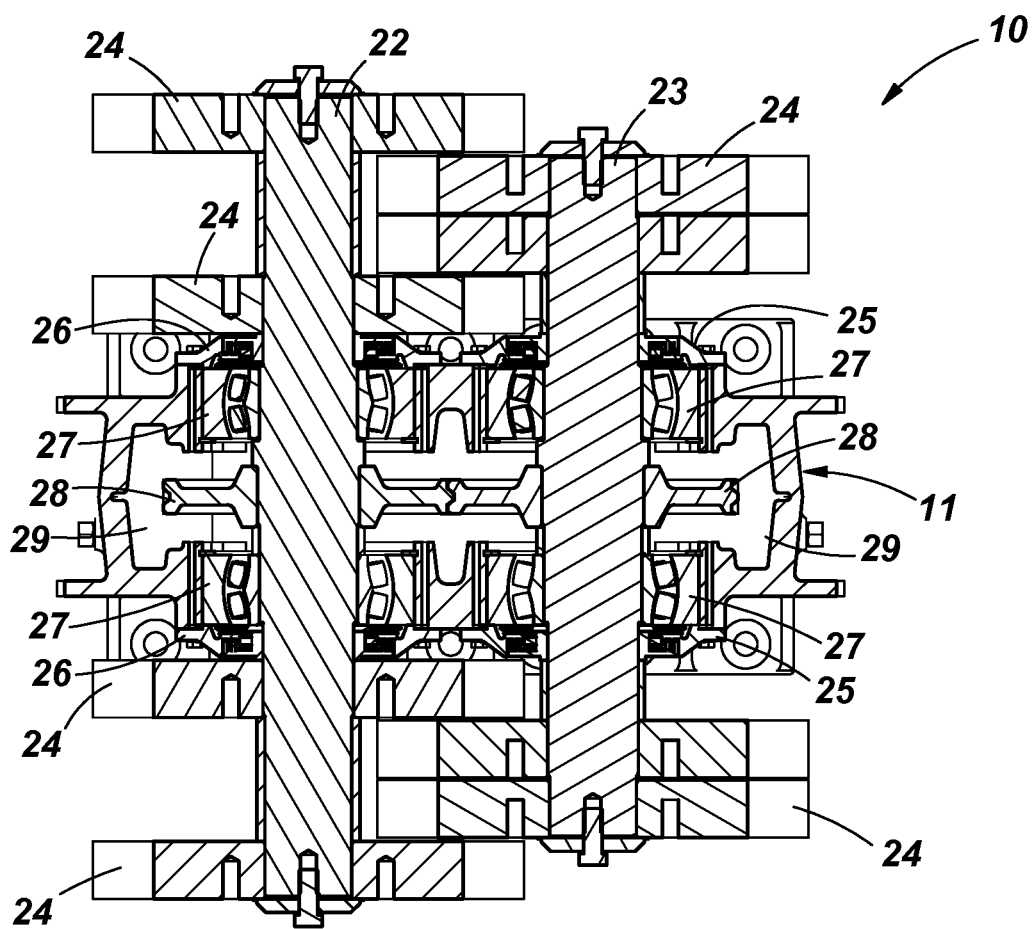
FIG. 4 is a section plan view through a horizontal plane containing the shaft axes of the exciter apparatus shown in FIG. 1.

Improvements in exciter apparatus 40 and associated parts such as an exciter apparatus casing 50 and an adapter mounting plate 60 are described in the following. The exciter apparatus casing 50 is shown in many of FIGS. 5 to 17 but is represented specifically in FIG. 22 as a single piece, typically constructed as a metallic casting. The exciter apparatus casing 50 has an upper wall 51 with an upwardly facing surface 52, a lower wall 53 with a downwardly facing surface 54, and two opposed end walls 55, 56 continuously formed with the upper wall 51 and the lower wall 53. The exciter apparatus casing 50 further includes a first side face 57 and a second side face 58, facing in opposite directions.

Figure 5:
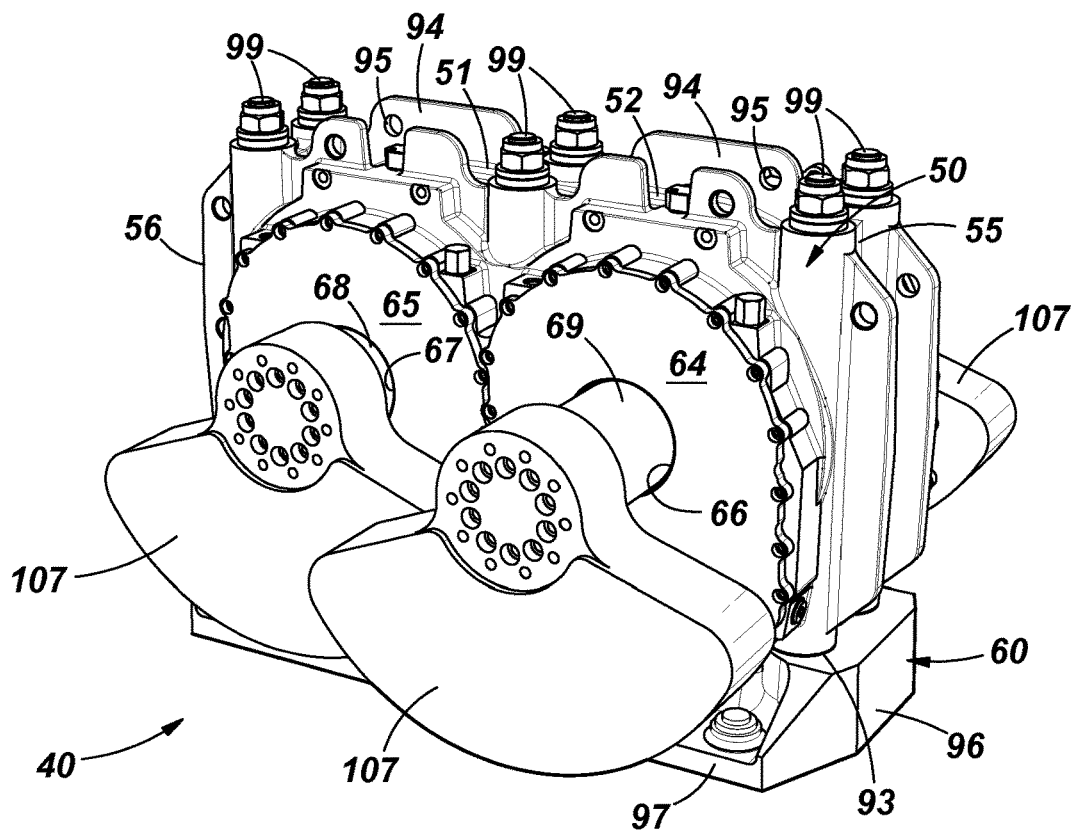
FIG. 5 is a perspective view of a preferred embodiment of exciter apparatus constructed in accordance with the developments of this disclosure.
Figure 6:
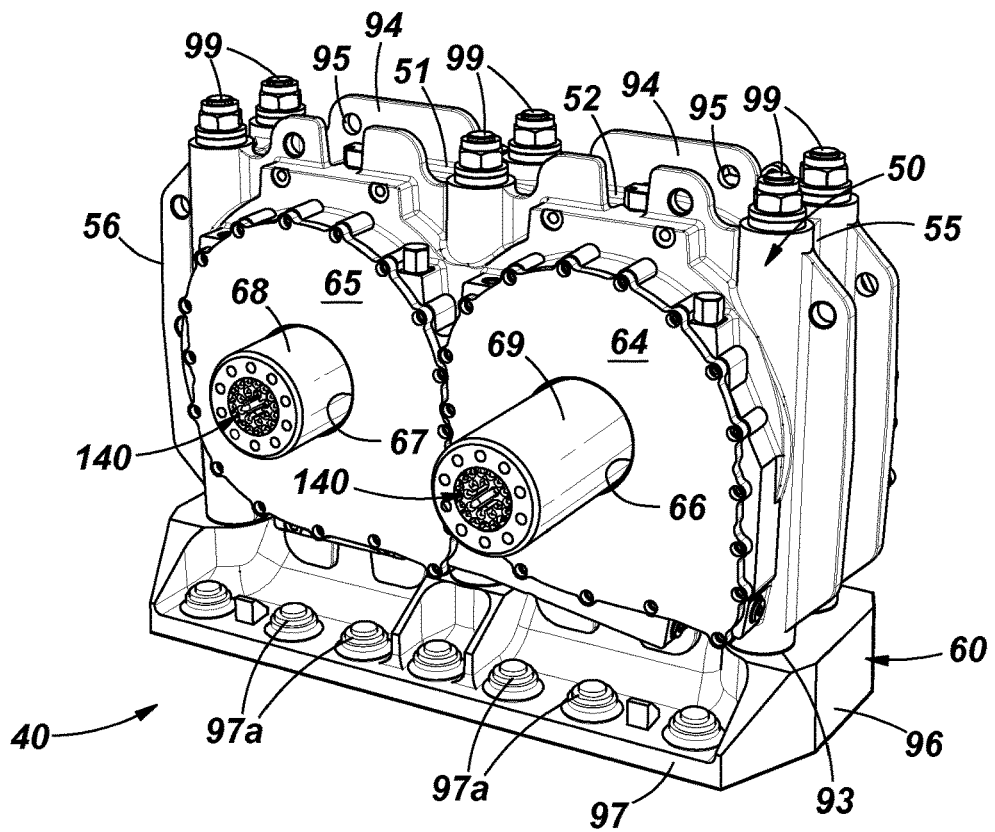
FIG. 6 is a perspective view similar to FIG. 5 but with the eccentric masses removed from the driven shafts.
Figure 22:
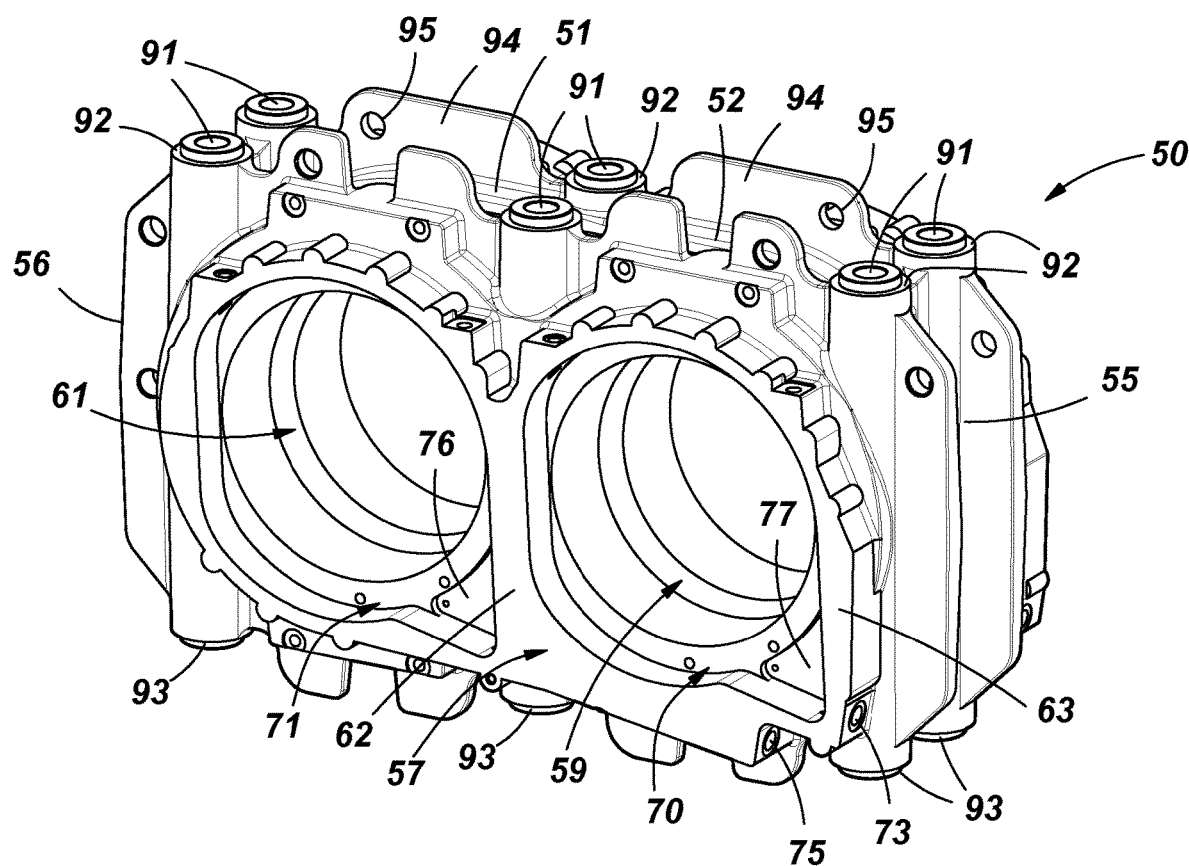
FIG. 22 is a perspective view of an exciter apparatus casing generally as utilised in earlier drawings.

As can be seen in FIG. 22, the exciter apparatus casing 50 has a first bearing mounting compartment 59 adjacent to and inwardly positioned relative to an end wall 55, and a second bearing mounting compartment 61 adjacent to and inwardly positioned relative to the other end wall 56. An intermediate wall structure 62 connected to the upper wall 51 and the lower wall 52 is positioned between the first and second bearing compartments 59, 61. A seal surface 63 is located in the first side face 57 and forms part of the intermediate wall structure 62 and surrounds the first and the second bearing compartments 59, 61. As can be seen in FIGS. 5, 6 and other drawings, closure plate members 64, 65 are mounted to and sealed to the seal surface 63 by a plurality of fastener members of any suitable type. The closure plate members 64, 65 include central openings 66, 67 which accommodate respectively a short driven shaft 68 and a long driven shaft 69 with suitable seals (not shown) engaging with the shafts 68, 69 to maintain sealed conditions within the exciter apparatus 40.

As also can be seen in FIG. 22 an enlarged region forming a first bearing lubricating liquid sump zone 70 is positioned between the first bearing mounting compartment 59 and the closure plate member 64. A similar enlarged region forming a second bearing liquid sump zone 71 is positioned between the second bearing mounting compartment 61 and the closure plate 65. In the assembled configuration of the exciter apparatus 40, the first and the second bearing liquid sump zones 70, 71 are maintained completely separate from one another whereby it is possible to prevent contaminants from the gear liquid sump entering the bearing liquid sumps, also to select and use lubricating liquids in the respective sump zones 70 and 71 that have differing characteristics, such as viscosity, that are best selected for operation of the exciter apparatus 40, particularly to improve performance of same and to extend periods between potential maintenance stages.

Figure 21:
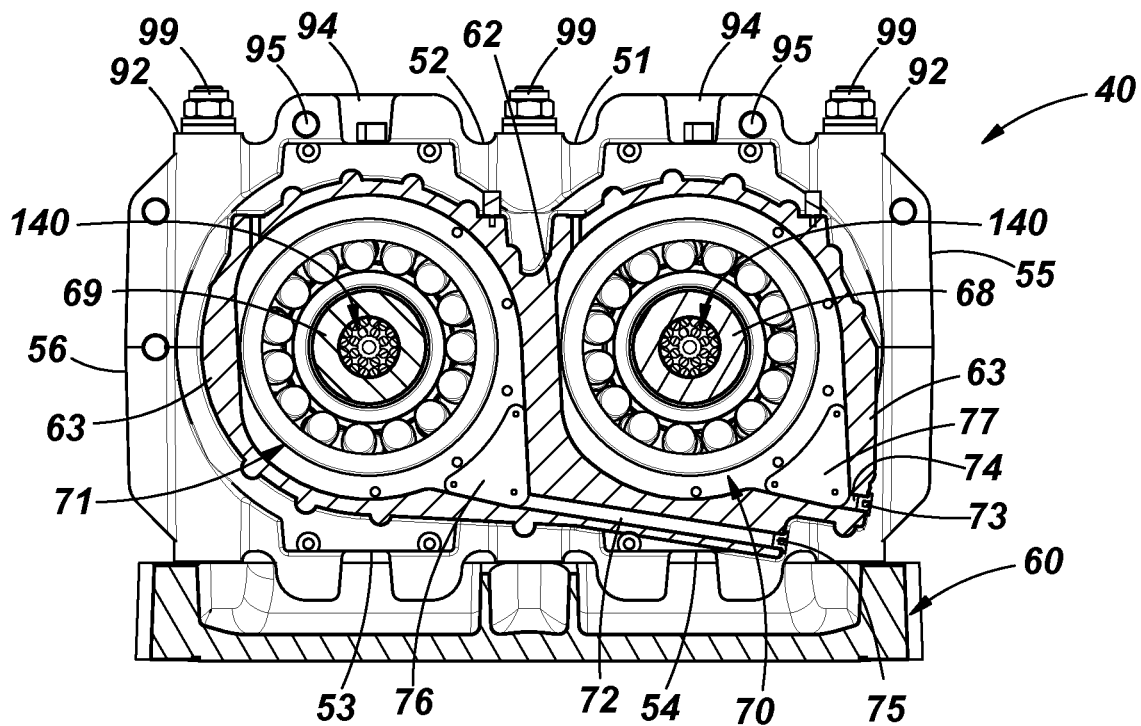
FIG. 21 is a section view along line X-X of FIG. 20.

FIG. 21 illustrates a drain passage 74 leading from the first bearing liquid lubricant sump zone 70 to a drain point 73 whereby, during a maintenance stage, used liquid lubricant can be removed from the first bearing liquid sump zone 70. Similarly, a drain passage 72 leading from the second bearing liquid lubricant sump zone 71 to a drain point 75 is provided whereby during a maintenance stage, used liquid lubricant can be removed from the second bearing liquid lubricant sump zone 71. Suitable inlet port means are provided through the upper wall 51 to allow original or replacement liquid lubricant to be introduced into either the first or the second bearing liquid lubricant sumps 70, 71. As can be seen in FIG. 27, and other drawings, each of the first and the second bearing liquid lubricant sump zones 70, 71 have a triangular shaped bulge or extension region 76, 77 approaching the entrances to drain passages 72, 74 acting as a collection zone for the liquid lubricant and potentially any particulate debris that might enter or be formed within the exciter apparatus such that it might be removed with any used or spent liquid lubricant.

FIG. 22 illustrate that each of the first and the second bearing mounting compartments 59, 61 end part way towards the second side face 58. The second side face 58 has a seal surface 78 generally surrounding a gearing mounting compartment 79 configured to house separate gears 80, 81 that are mounted on the driven shafts 68, 69. Closure plates 82, 83 (FIG. 14) are sealed to the first and second bearing mounting compartments 59, 61 internally of the exciter apparatus 40. The closure plates 82, 83 have central openings 84, 85 through which the driven shafts 68, 69 pass, the closure plates 82, 83 having suitable seal means to prevent liquid lubricant and other materials to pass along the shafts.

Figure 17:
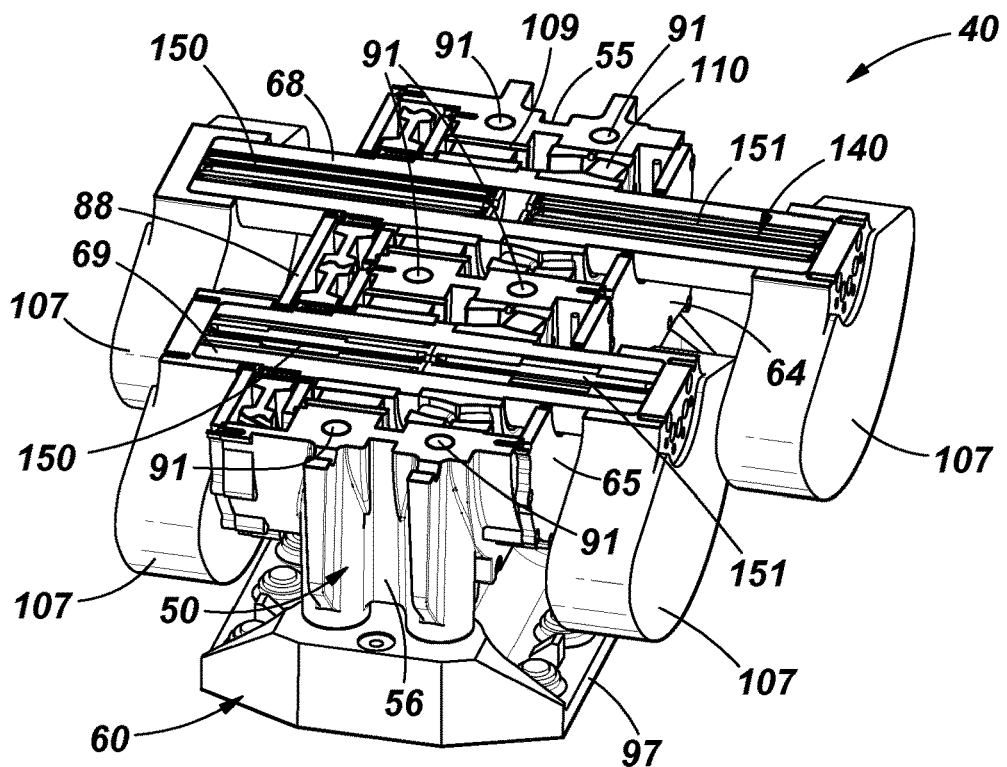
FIG. 17 is a perspective view horizontally sectioned through the driven shafts.
Figure 20:
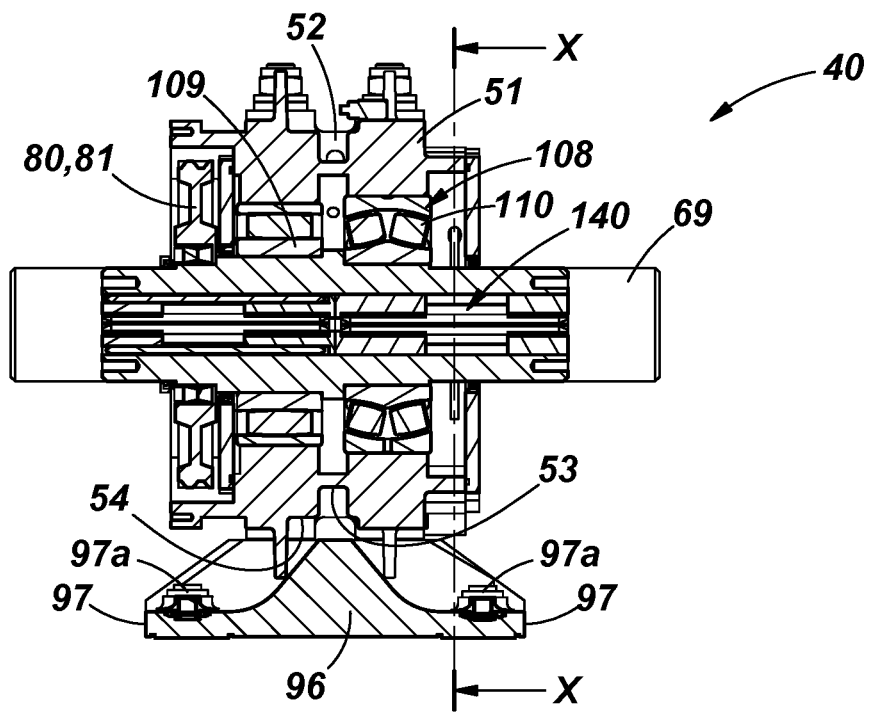
FIG. 20 is a vertical section view of the exciter apparatus passing through the short driven shaft.

As shown, for example, in FIGS. 17, 20, bearing means 108 may be provided to support the driven shafts 68, 69 in the first and the second bearing mounting compartments 59, 61. The bearing means 108, in each case, may comprise a pair of side by side bearing members 109 and 110. The bearing member 109 is conveniently a toroidal roller bearing and the bearing member 110 is a spherical roller bearing (SRB). While the drawings represent two driven shafts 68, 69 and a consequent supporting bearing arrangement as illustrated, in some embodiments one driven shaft only might be provided and more than two driven shafts might be provided.

Figure 7:
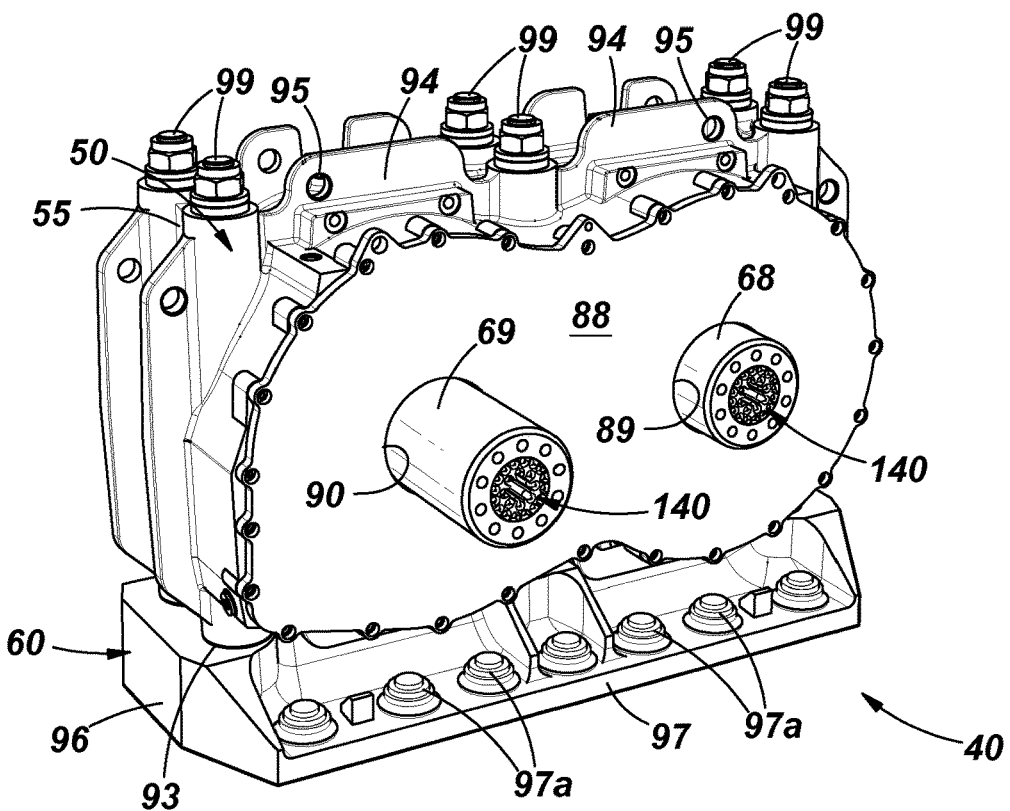
FIG. 7 is a perspective view of the exciter apparatus of FIG. 6 taken from the opposite side.
Figure 8:
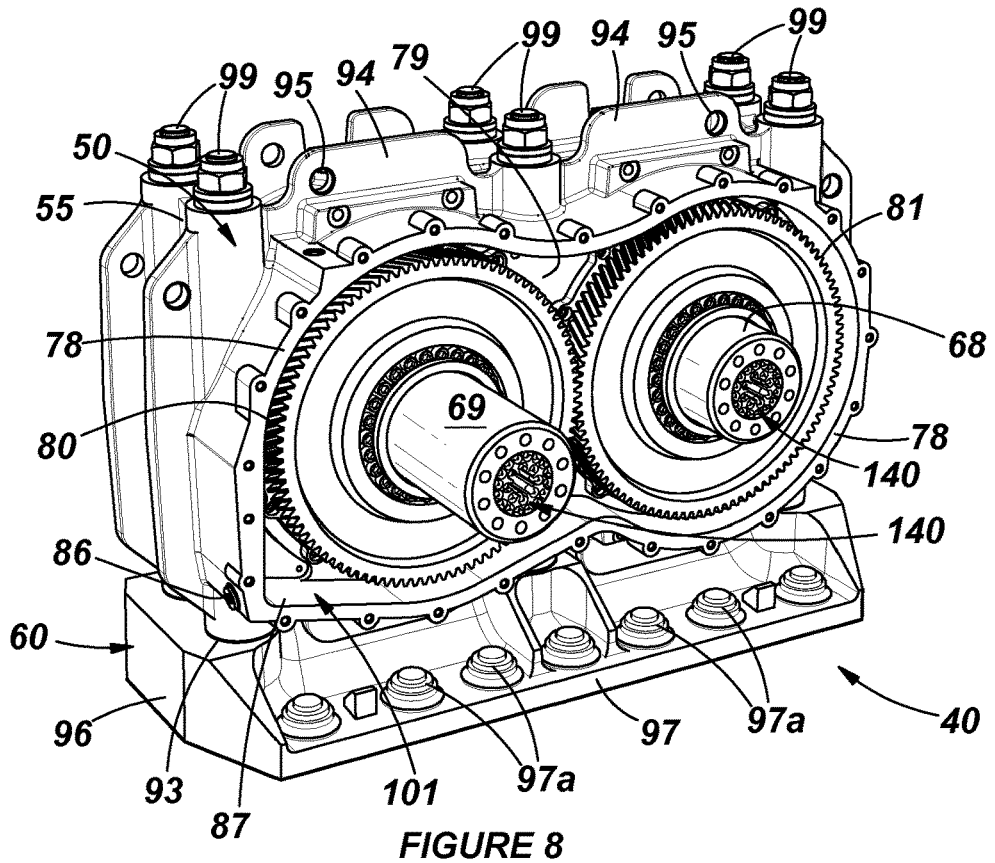
FIG. 8 is a perspective view similar to FIG. 7 but with a side closure plate removed.

The gearing mounting compartment 79 has a liquid lubricant introduction port in the upper wall 51 whereby liquid lubricant of a desired type or characteristics can be introduced into the compartment 79 either before use or during a later maintenance stage of the exciter apparatus 40. A drain port 86 (FIG. 8) is provided with a communicating drain passage leading to a lower region of the gearing mounting compartment 79. Conveniently, the gearing mounting compartment 79 includes an enlarged triangular bulge portion 87 leading to the drain passage at a low portion of the compartment 79. The compartment 79 provides a gearing lubricating liquid sump zone 101. Conveniently, an outer closure plate 88 closes the gearing mounting compartment 79 by sealing means and multiple fastener members pressing an edge face region of the outer closure plate 88 against the seal surface 78. Again the closure plate 88 includes central openings 89, 90 and seal means cooperating with the driven shafts 68, 69 (FIG. 7).

Referring again to FIG. 22, the exciter apparatus casing 50 incudes a plurality of elongated fastener receiving bore means 91 positioned vertically extending through the casing 50. Each of the fastener receiving bore means 91 includes a first end zone 92 disposed at or adjacent to the upwardly facing surface 52 of the upper wall 51, and a second end zone 93 disposed at or adjacent to the downwardly facing surface 54 of the lower wall 53. Preferably, the fastener receiving bore means 91 includes a continuous bore passage from the first end zone 92 to the second end zone 93. Alternatively, at least some of the fastener receiving bore means 91 include a first bore passage section adjacent the first end zone 92 with a continuous bore passage section aligned with a second bore passage section adjacent the second end zone 93 with a continuous bore passage section. In this latter option, seal means operating between a cooperating elongated fastener and the fastener receiving bore means 91 at the upper level of the exciter apparatus casing 50 and at the lower level of the exciter apparatus housing would be required.

In the illustrated preferred embodiment show in in FIG. 22 and other figures, the fastener receiving bore means 91 are disposed in a defined array, consisting of six bore passages 91, each being adapted to receive an elongated bolt, rod or other suitable fastener 99. Two such bore passages are located on a transverse mid point axis of the exciter apparatus casing 50 and two each are located extending through a respective end wall 55 and 56. In some cases, the two centrally located bore passages might be replaced by a single bore passage centrally located. Other possible arrangements of bore passages in the array are possible, however it is desirable to have the bore passages symmetrically disposed about a central transverse axis. Both of the first end zone 92 and the second end zone 93 may include physical formation means such as the illustrated raised annular ring that is complementary shaped with physical formation means on the adapter mounting plate 60 to prevent or minimise lateral movement when engaged.

Preferably, both the upper wall 51 and the lower wall 52 includes upstanding flange members 94 with apertures 95 to assist lifting means to be connected to the exciter apparatus 40 when installing or removing such exciter apparatus from an operative position.

Referring to the drawings, the adapter mounting plate 60 includes a central section 96 and edge sections 97 with spaced bores and fasteners 97a along its length each being adapted to receive a suitable fastener member. In the illustrated embodiments, the bores with fasteners 97a in edge sections 97 are positioned to allow the adapter mounting plate 60 to be mounted to a fixing position in Schenck Process mineral processing or handling equipment constructed to install an existing DF6xx series exciter apparatus, for example, constructed according to FIGS. 1 to 4. In the case of some other existing exciter apparatus that might need to be replaced, the configuration of the adapter mounting plate and the holes or bores for mounting same might vary to be consistent with the existing structures. The adapter mounting plate 60 further includes long bolt or rod fastening positions 98 that may comprise an array of upraised boss formations along the central section 96 configured to correspond and be complementary to the first end zones 92 and the second end zones 93 provided on the upper wall 51 and the lower wall 53 of the exciter apparatus casing 50.

Each of the upraised boss formations include fastening bore means or any other connection means forming the long bolt or rod fastening positions 98 engageable with an end of an elongated fastening bolt, rod or the like 99 passing through an elongated fastener receiving bore means 91. The boss formations may also include formation means cooperable with and complementary to the physical formation means on the first end zone 92 and the second end zone 93 of the fastener receiving bore means 91. Alternatively, the adapter mounting plate 60 may include recessed zones to form the long bolt or rod fastening position 98 engageable with either the first zones 92 or the second end zones 93 of the fastener receiving bore means 91.

Figure 9:
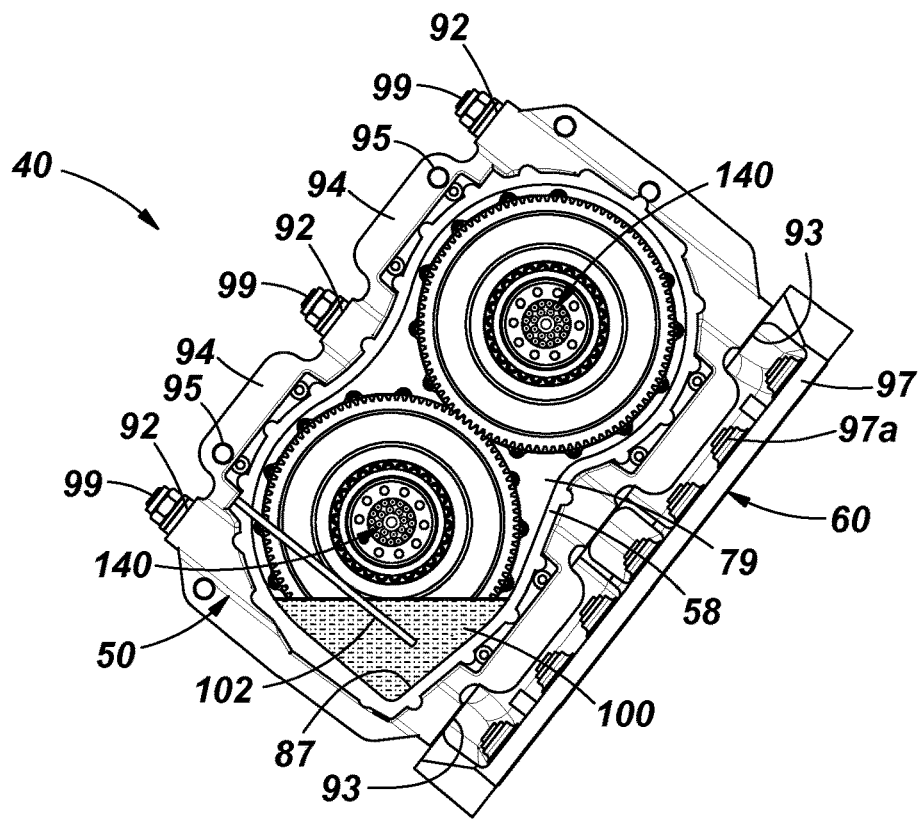
FIGS. 9 and 10 are side elevation views similar to FIG. 8 showing potential differing installation positions of the exciter apparatus, from the intermeshing gear side of the exciter apparatus.
Figure 10:
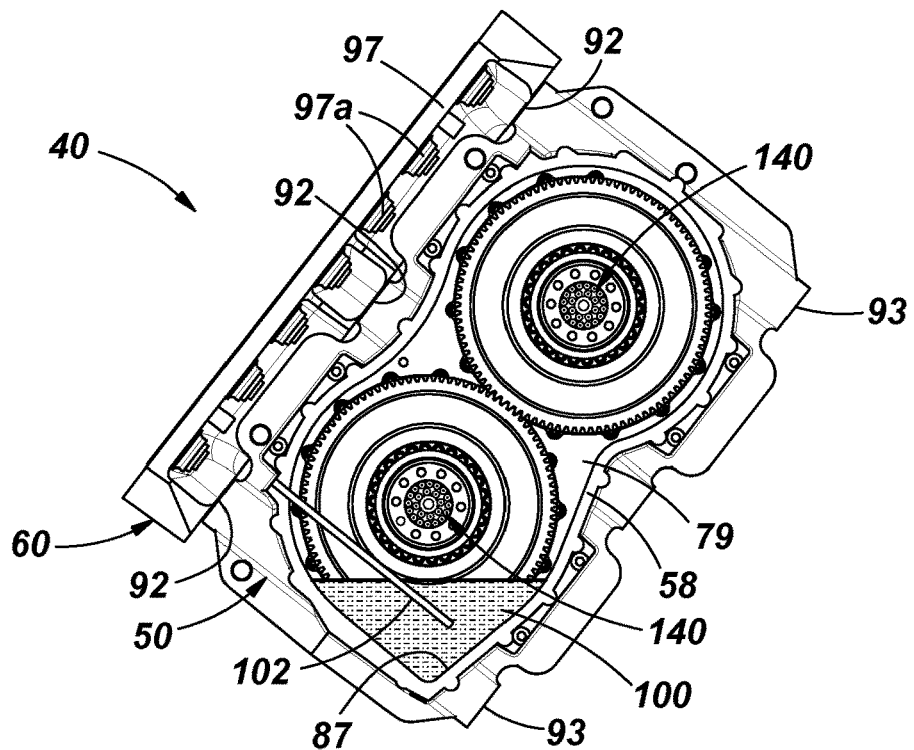
Figure 11:
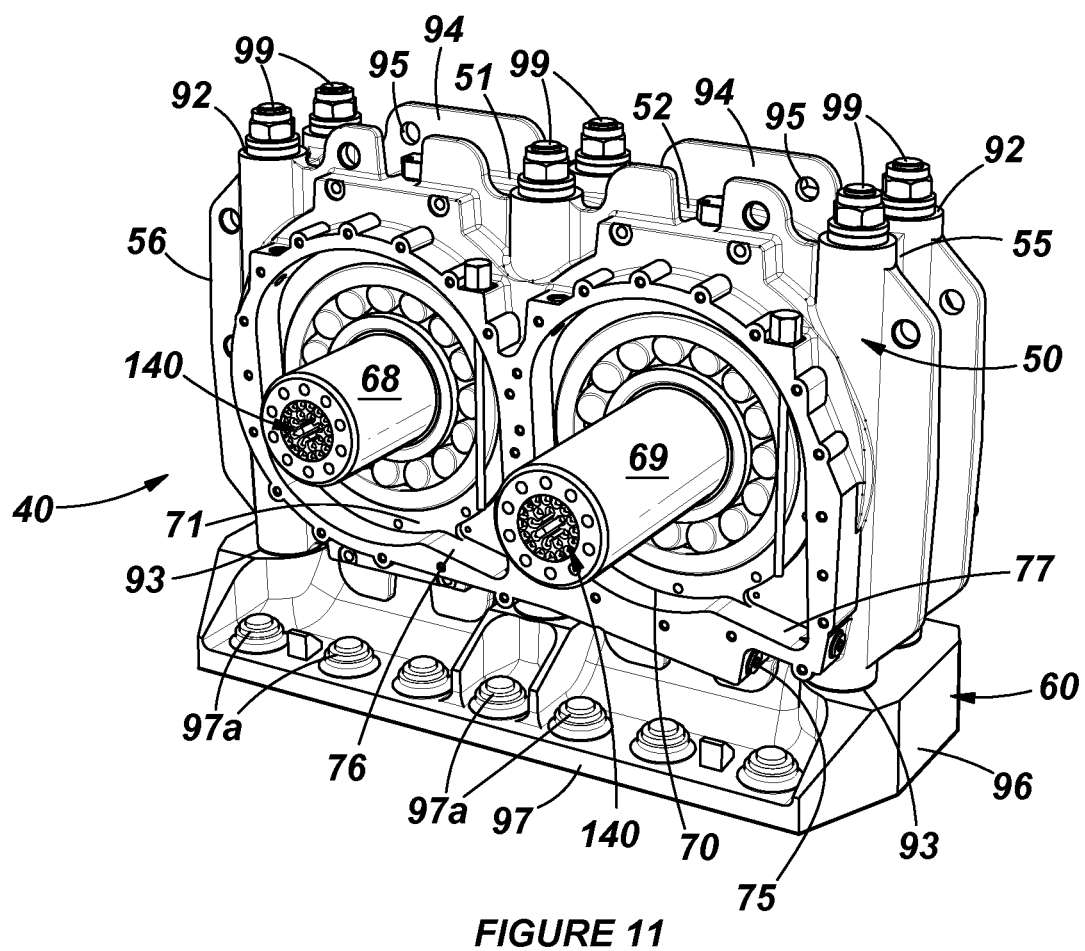
FIG. 11 is a perspective view similar to FIG. 6 but with a side closure plate removed revealing bearing means supporting the driven shafts.
Figure 12:
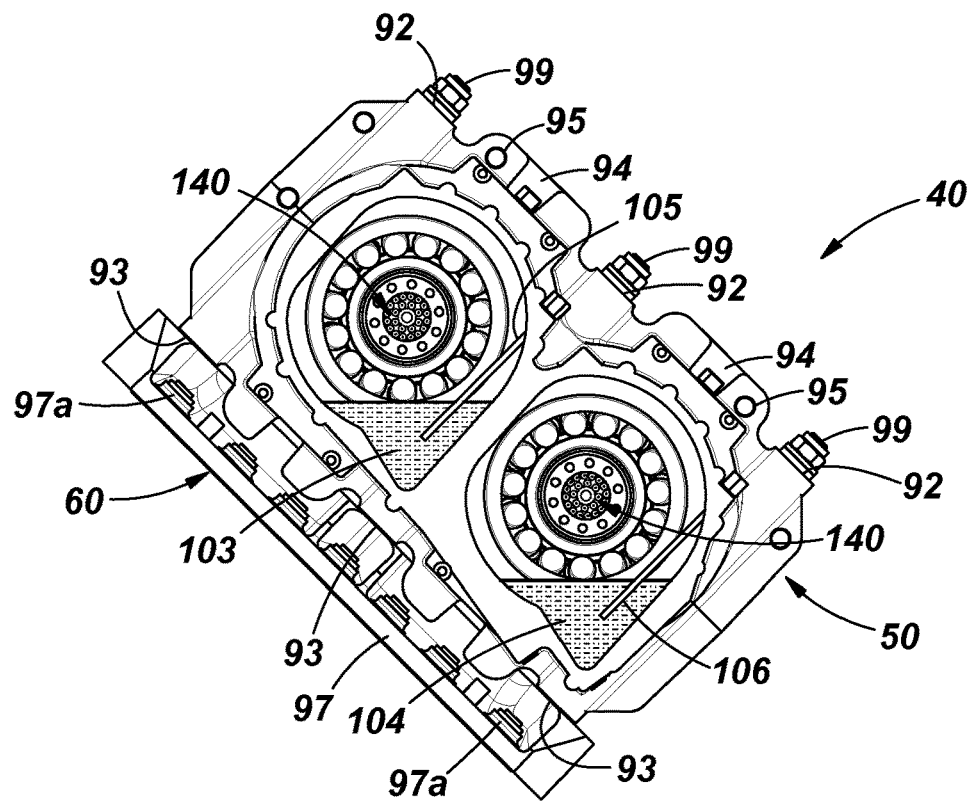
FIGS. 12 and 13 are side elevation views similar to FIG. 11 showing potential differing installation positions of the exciter apparatus, from the bearing means side of the exciter apparatus.
Figure 13:
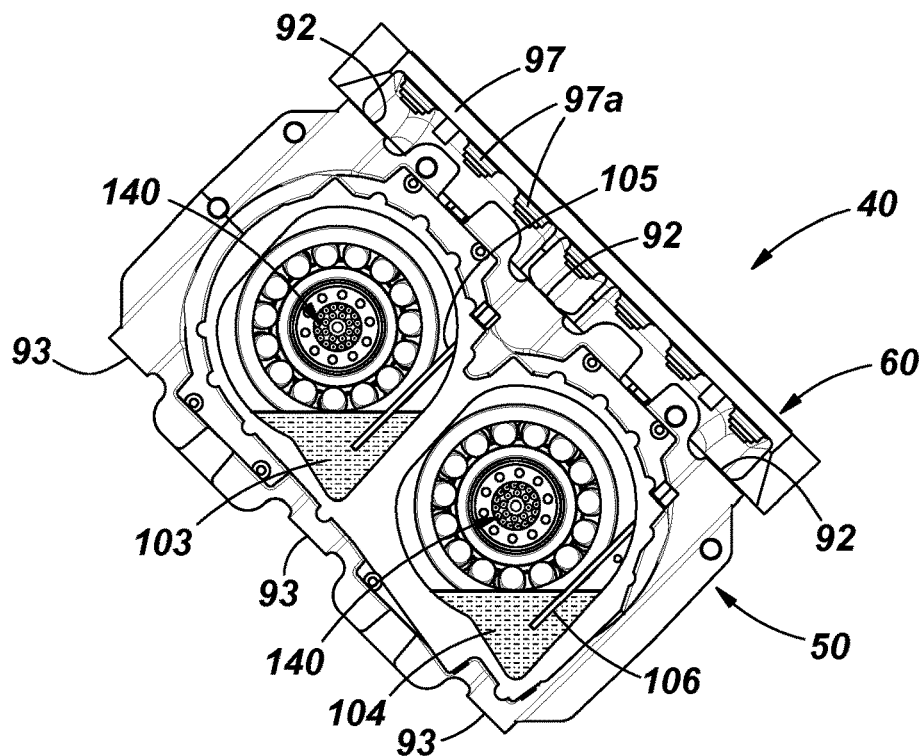
Figure 14:
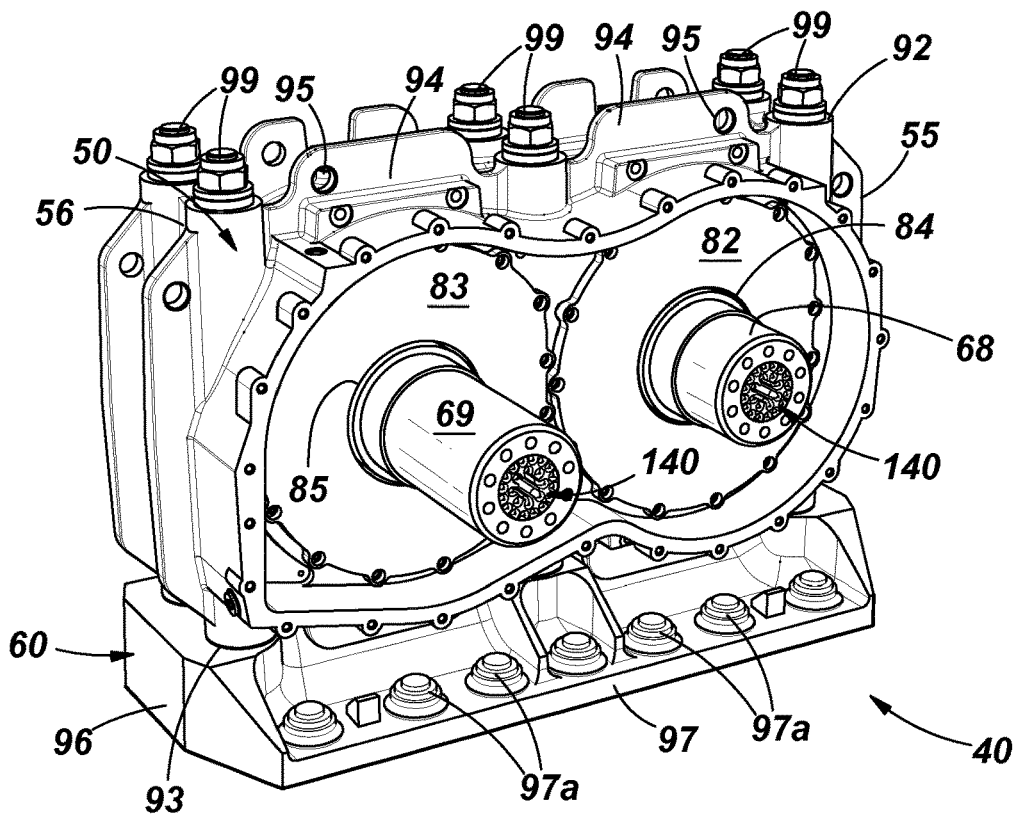
FIG. 14 is a perspective view similar to FIGS. 7 and 8 but with the gearing elements removed with closure plates closing bearing compartments housing bearings supporting the driven shafts.
Figure 15:
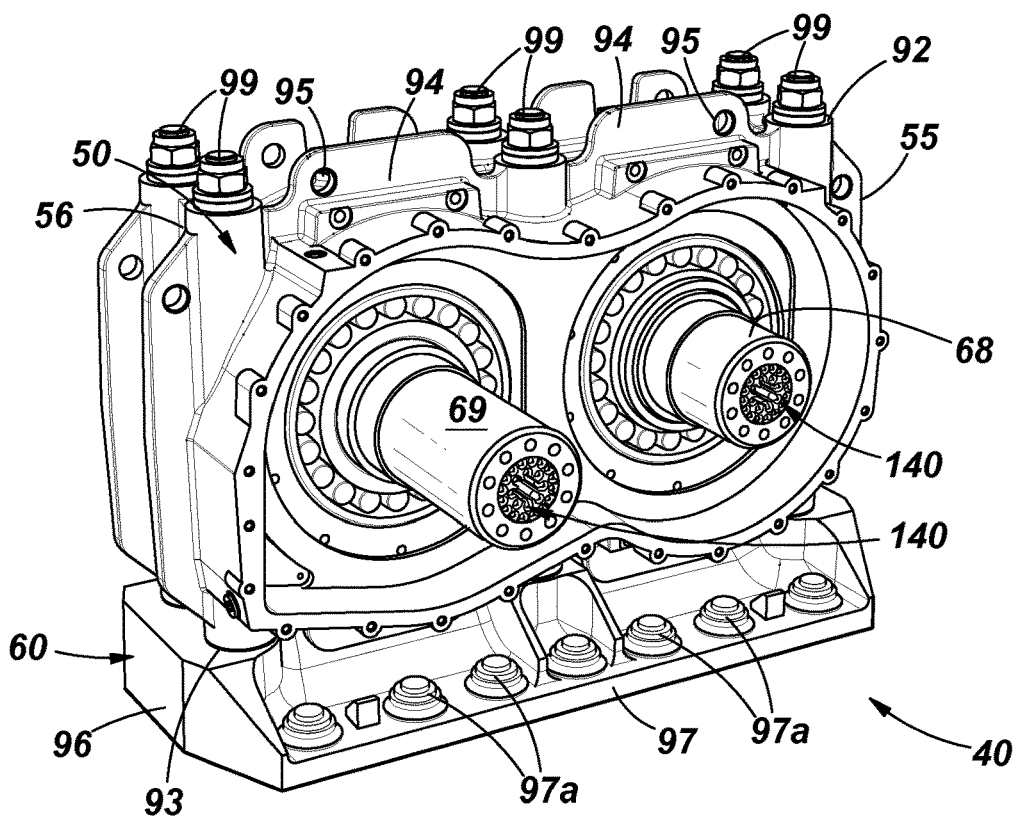
FIG. 15 is a view similar to FIG. 14 with the closure plates removed showing bearings in the bearing compartments.
Figure 16:
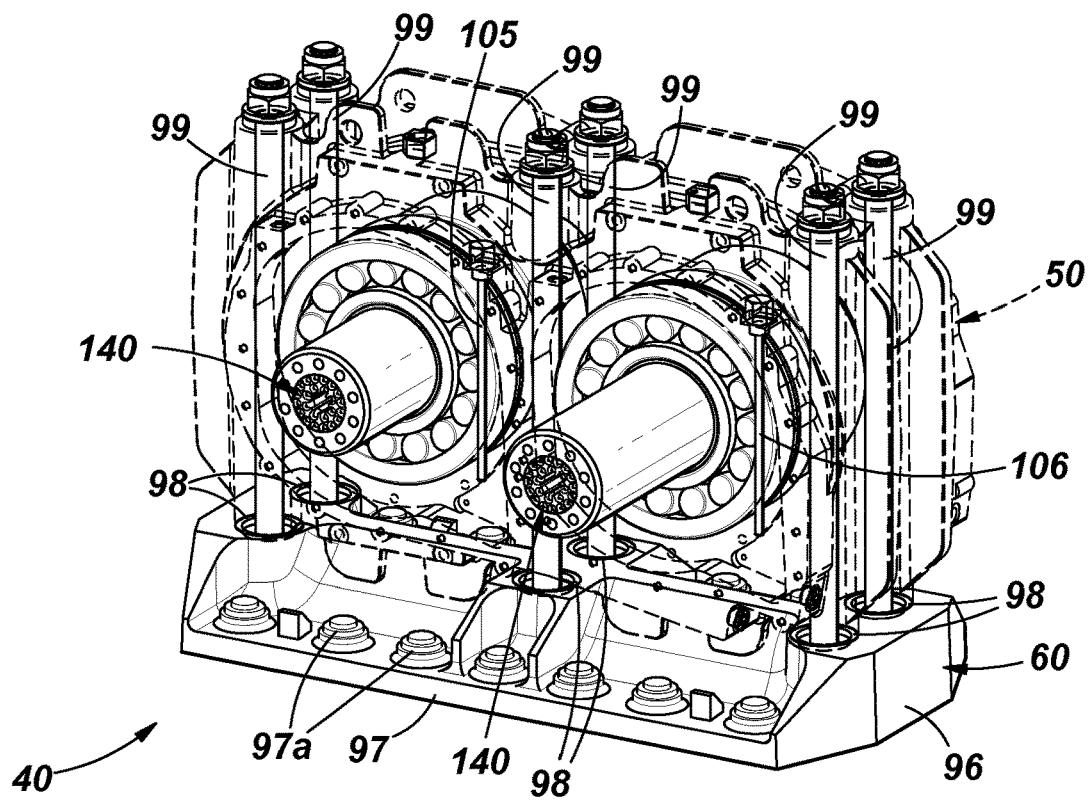
FIG. 16 is a perspective view similar to FIG. 6 but with the exciter apparatus casing shown in ghosted outline to reveal aspects of the elongated fastener elements.

FIGS. 9/10 and FIGS. 12/13 illustrate the effect of mounting the exciter apparatus 40 and the associated adapter mounting plate 60 at differing angles of inclination and particularly when the exciter apparatus is mounted with its upper wall closest to the adapter mounting plate 60 rather than its lower wall as shown in FIGS. 10 and 13. FIGS. 9/10 show the exciter apparatus from the gearing side of the exciter apparatus 40 with the outer closure plate 88 removed. FIGS. 12/13 show the exciter apparatus 40 from the bearing side of the exciter apparatus 40 with the two outer closure plates 64, 65 removed. As shown in FIG. 17, the lower wall 53 of the exciter apparatus casing 50 faces toward the adapter mounting plate 60 with the second end zones 93 of the fastener receiving bore means 91 in engagement with a respective long bolt or rod fastening position 98. In the partially inclined and inverted position shown in FIG. 10 the first end zones 92 of the upper wall 51 are positioned in engagement with a fastening position 98 on the adapter mounting plate 60. In either positional location represented in FIGS. 9 and 10 an elongated fastener member 99 passes through the fastener receiving bore means 91 to secure the exciter apparatus 40 to the adapter mounting plate 60 and thereby to the processing or handling equipment (not shown). FIGS. 9 and 10 illustrate the lubricating liquid pool 100 collected in the gearing lubricating liquid sump zone 101 formed by the compartment 79. The lubricating liquid pool 100 is collected in the region of the enlarged bulge portion 87 and a stationary, semi-permanent, level measuring probe 102 is provided to provide automatically a signal indicative of the liquid level, and thereby, the volume of lubricating liquid in the gearing mounting compartment 79. If the mounting inclination angle is reversed, then the illustrated structures permit the exciter apparatus 40 to be rotated about a central vertical axis such that the lubricating liquid pool 100 will always form in the region of enlarged bulge portion 87 and the level measuring probe 102. In this manner, it is possible to achieve consistent measuring of lubricating liquid volumes in the gearing mounting compartment.

FIGS. 12 and 13 show the effects discussed in the preceding paragraph from the bearing side of the exciter apparatus 40. It is apparent from these drawings that separate lubricating liquid pools 103 and 104 are maintained in the first bearing liquid lubricant sump zone 70 and the second lubricant liquid sump zone 71 with the pools 103, 104 being located in the region of the extension or bulged regions 76, 77. In addition separate liquid level measuring probes 105, 106 are installed in these zones.

Generally, the exciter apparatus 40 will carry eccentric masses 107 carried on the driven shafts 68, 69 (FIG. 5). In the proposed design, the one eccentric mass 107 is carried at each end zone of the driven shafts 68, 69 which overlap, in use when the driven shafts 68, 69 are rotated. Dynamic guard shields would also be provided (not illustrated) mounted from the exciter apparatus casing 50, however, because of the design arrangements previously described, access to the elongated fastener means 99 is not obstructed. This enables the dynamic guard shields to remain attached to the exciter apparatus 40 if the exciter apparatus 40 is to be removed for any purpose.

Figure 18:
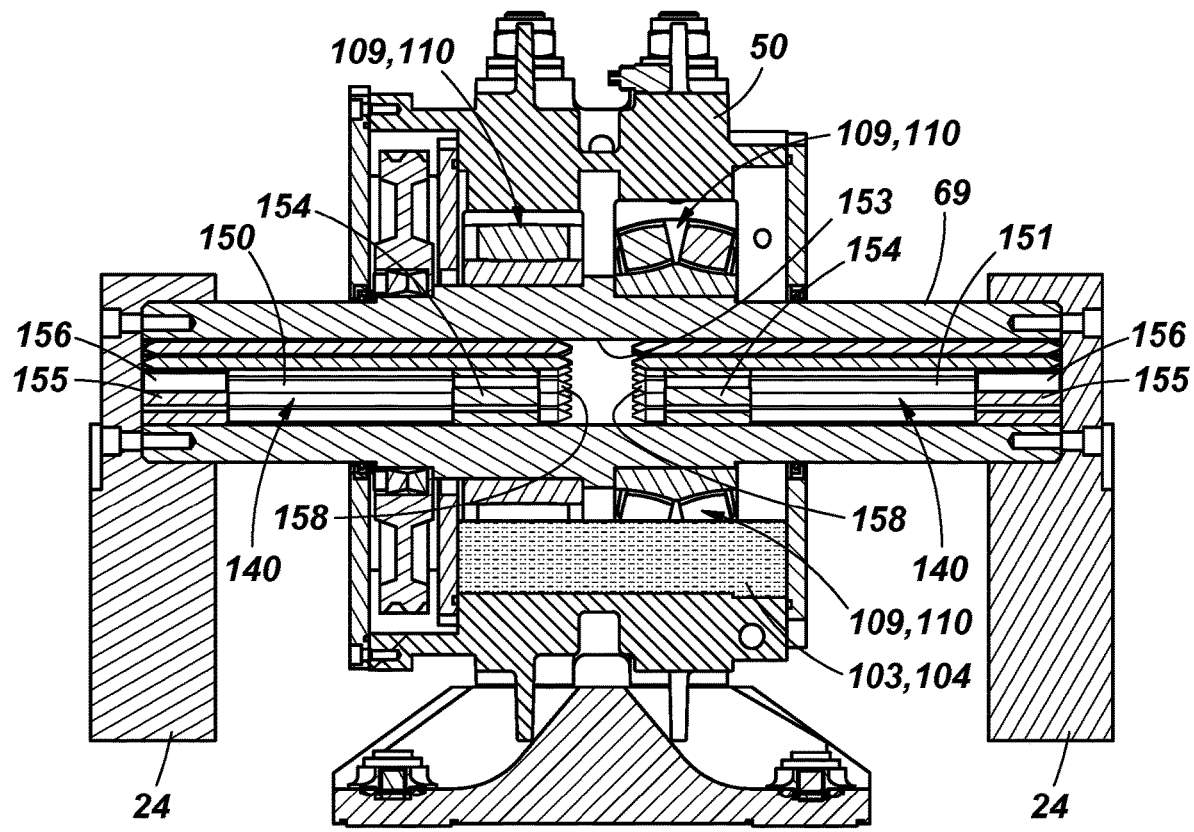
FIG. 18 is a section view taken through the long driven shaft illustrating cooling cartridge elements mounted in the long driven shaft.
Figure 19:
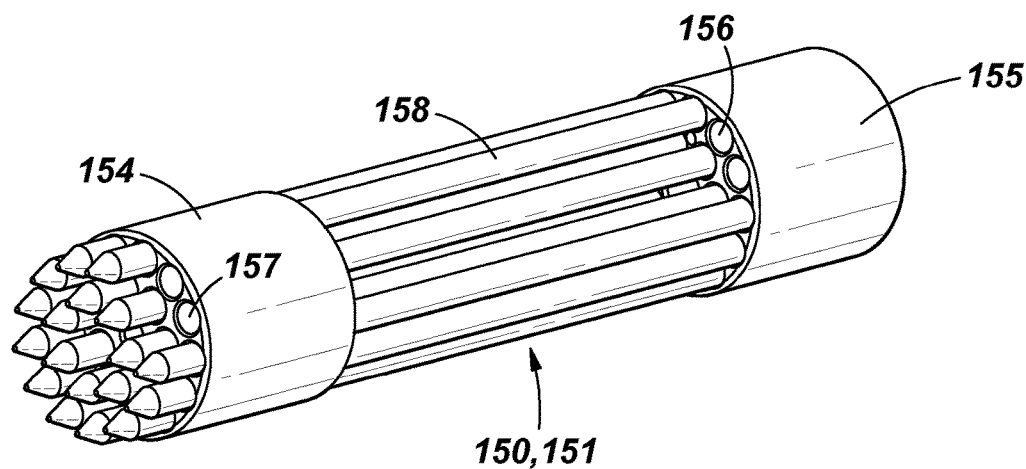
FIG. 19 is a perspective view of one of the cooling cartridge elements with several of the heat pipes removed.

FIGS. 18 and 19 illustrate cooling means 140 being one preferred method of cooling the bearing members 109, 110 and the liquid lubricant in the separate liquid lubricant sump zones 103, 104. In this arrangement, a cooling cartridge assembly 150, 151 is/are installed in a bore 153 formed in each of the driven shafts 68, 69. Each cooling cartridge element 150, 151 includes a heat receptor mounting element 154 positionable, in use, in the bore 153 adjacent one of the bearing members 109, 110 and a second heat dissipation mounting element 155 position at or close to an outwardly positioned end of a driven shaft 68, 69, i.e. outwardly of the exciter casing 50. Each of the mounting elements 154, 155 comprise a cylinder sized to form a sliding fit in one of the bores 153. Each of the mounting elements 154, 155 have an array of mounting bores 156, 157 to receive and hold a plurality of heat pipes 158 as described earlier. A heat flow path is thereby provided from a respective said bearing member 109, 110 through the driven shafts 68, 69 to the heat receptor mounting elements 154, and thereafter along the heat pipes 158 to the heat dissipation mounting elements 155 positioned outwardly of the exciter casing 50. Heat can then flow and be dissipated outwardly from the heat dissipation mounting elements 155 through the driven shafts 68, 69 and be dissipated to the environment. This dissipation might be assisted by providing fan means blowing over the external end regions of the driven shafts 68, 69 and eccentric masses mounted therefrom. While two separate cooling cartridge elements 150, 151 are illustrated in FIG. 18 and in other drawings, it is possible to provide one such cooling cartridge element with a central heat receptor mounting element mounting two separate banks of heat pipes 158, with each bank of heat pipes extending outwardly to separate outwardly positioned second heat dissipation mounting elements 155.

It is of course desirable to ensure high degrees of heat transfer capability exist between the heat receptor mounting elements 154 and the inwardly facing surfaces of the bore 153, as well as between the heat dissipation mounting element 155 and the inwardly facing surfaces of the bore 153. Moreover, given that the vibration exciter apparatus is, in operation, continually subject to vibration at various levels, it is desirable that the cooling cartridge assembles 150, 151 fixed in their operational position and will not shake loose therefrom. In this regard a close fit is desirable between the surfaces of the bore 153 and the surfaces of the mounting elements 154, 155. This can be achieved by providing a glue between there surfaces, a solder connection between these surfaces, a press or heat interference fit between these surfaces, or/a mechanical fixing system. Further a heat transfer paste might be employed to improve heat transfer as described above between the respective parts. Similar reliable fixing between the heat pipes 158 and the mounting bores 156, 157 would also be required utilising one or more of the above discussed methods.

Other forms of cooling the bearings member 109, 110 and/or the intermeshing gears 80, 81 and the liquid lubricant in the various sump zones could be used. These may include heat conductor elements embedded in one or both the driven shafts; heat conductor elements embedded in wall structures of the exciter casing adjacent the sump zones; heat flow passages in one or both the driven shafts to receive a cooling flow of cooling fluid or cooling gas/air; heat flow passages in wall structures of the exciter casing adjacent the lubricant sump zones to receive a cooling flow of cooling fluid or cooling gas/air; and heat pipes or heat pipe assembles positioned in or adjacent wall structures of the exciter casing adjacent the lubricant sump zones.

It should of course be recognized that as proposed previously, providing separate lubricating liquid sump zones carries with it an expectation that these configurations will result in higher heat transfer out of the bearings that occur with current designs. A second option is to utilise high thermal conductivity materials, in the exciter apparatus casing structures, particularly in bearing compartment closure covers. A third potential option is to provide a cooling fan on one or both driven shafts to increase air flow onto the exciter apparatus casing walls. A fourth option is to provide high thermal conductivity inserts into the exciter apparatus walls or the driven shafts. A fifth option is to position heat flow pipes for passage of cooling air flow or liquid flow in the housing walls and the driven shafts. Of course, multiple such options might be utilised.

The foregoing describes various preferred embodiments of exciter apparatus for imposing a vibration regime to mineral processing or handling equipment and to parts of such exciter apparatus. Improvement features, in some instances, also relate to and may be applied to other known exciter apparatus by skilled persons in this art. Features disclosed specifically in relation to one embodiment might equally apply to other exciter apparatus, and parts of same, within the context of the annexed patent claims.

The claims defining the invention are as follows:

1. A vibration exciter apparatus configured, in use, to impose a vibration regime to vibration processing or handling equipment, said vibration exciter apparatus comprising:
    an exciter housing;
    at least one bearing means, the at least one bearing means being operationally mounted in an internal zone of said exciter housing to be, in use, in/at least partial contact with liquid lubricant in a liquid lubricant sump zone with said at least one bearing means being lubricated by liquid lubricant from the liquid lubricant sump zone, the at least one bearing means supporting a driven shaft carrying eccentric mass means externally of said exciter housing; and
    cooling means arranged to receive heat from the at least one bearing means and/or said liquid lubricant in said liquid lubricant sump zone and to convey said heat at least partially to a position externally of said exciter housing, wherein the cooling means is positioned to receive heat from each the at least one bearing means, wherein the vibration exciter apparatus includes two spaced said driven shafts, each being supported by the at least one bearing means, and wherein each said bearing means is positioned in a separate the liquid lubricant sump means located within the internal zone of the exciter housing.

2. The vibration exciter apparatus according to claim 1, wherein the cooling means includes a first heat receptor means positioned adjacent the or each said bearing means to, in use, receive heat from the or each said bearing means, and at least one heat flow path extending from the or each said first heat receptor means to a position externally of said exciter housing whereby heat flows along the or each said heat flow path to said position externally of said exciter housing.

3. The vibration exciter apparatus according to claim 1, wherein said cooling means is at least partially located within the or each said driven shaft.

4. The vibration exciter apparatus according to claim 2, wherein the at least one bearing means includes a first bearing member and a second bearing member positioned axially spaced along said driven shaft.

5. The vibration exciter apparatus according to claim 2, wherein the cooling means includes one said first heat receptor means positioned adjacent the at least one bearing means with the heat flow path including a first section extending from the first heat receptor means towards a first end zone of the driven shaft, said cooling means further including a second said first heat receptor means positioned adjacent said bearing means with the heat flow path including a second section extending from the second heat receptor means towards a second end zone of the driven shaft.

6. The vibration exciter apparatus according to claim 5, wherein said first heat receptor means and said second heat receptor means are part of a single structure.

7. The vibration exciter apparatus according to claim 5, wherein said first heat receptor means and said second heat receptor means are separate from one another.

8. The vibration exciter apparatus according to claim 1, wherein said cooling means includes a second cooling means section positioned in a wall region of said exciter housing with at least a first portion of said second cooling means section positioned adjacent the or each said liquid lubricant sump zone, whereby said first portion absorbs heat from said adjacent liquid lubricant sump zone and said second cooling means section transfers at least a portion of said absorbed heat to a position external of said exciter housing.

9. The vibration exciter apparatus according to claim 1, wherein the cooling means includes one or more heat pipes.

10. The vibration exciter apparatus according to claim 1, wherein the cooling means includes one or more heat flow passage means configured to receive heat from said bearing means and to transfer said received heat to a position externally of said exciter housing by passing a cooling gas or fluid flow through said heat flow passage means.

11. The vibration exciter apparatus according to claim 10, wherein said cooling means includes said heat flow passage means in the driven shaft.

12. The vibration exciter apparatus according to claim 1, wherein said cooling means further includes heat conductor element means embedded in the or each said driven shaft, said heat conductor element means moving heat to a position external of said exciter housing.

13. The vibration exciter apparatus according to claim 1, further comprising intermeshing gears each being carried by a separate said driven shaft, said intermeshing gears being lubricated by at least one of said intermeshing gears being at least partially immersed in lubricating liquid in a separate said liquid lubricant sump means.

14. The vibration exciter apparatus according to claim 1, wherein said cooling means includes at least one cooling means assembly including a first heat receptor part and a first heat dissipater part spaced from one another and connected by one or more heat pipes, the or each said heat pipe being connected to the first heat receptor part and to the first heat dissipater part such that heat is transferrable from the first heat receptor part to the or each said heat pipe and from the or each said heat pipe to the first heat dissipater part, said cooling means assembly being positioned in passage means formed in a said driven shaft wherein the first heat dissipater part is positioned externally of said exciter housing.

15. The vibration exciter apparatus according to claim 14, wherein said first heat receptor part is positioned adjacent a said bearing means.

16. The vibration exciter apparatus according to claim 14, wherein each said cooling means assembly includes said first heat receptor part positioned within said passage means and a pair of said first heat dissipater parts each being located in said passage means and spaced from said first heat receptor part on opposite sides thereof, each of said first heat dissipater parts being connected by at least one said heat pipe to said first heat receptor part.

17. The vibration exciter apparatus according to claim 14, wherein two said cooling means assemblies are provided in each said passage means.

18. The vibration exciter apparatus according to claim 14, wherein each cooling means assembly includes multiple heat pipes.

19. The vibration exciter apparatus according to claim 1, wherein said cooling means includes at least one heat pipe positioned in a wall zone of said exciter housing, the or each said heat pipe having a first heat receptor means positioned adjacent the liquid lubricant sump zone to, in use, receive heat from the liquid lubricant in said liquid lubricant sump zone, each heat pipe having at least one heat flow path extending from the first heat receptor means to a position externally of said exciter housing whereby heat flows along the each heat flow path to said position externally of said exciter housing.

20. The vibration exciter apparatus according to claim 1, wherein said cooling means includes at least one heat flow passage means positioned in a wall zone of said exciter housing, said heat flow passage means enabling cooling fluid or cooling gas to flow there through to cool liquid lubricant in a said liquid lubricant sump zone.

21. The vibration exciter apparatus according to claim 1, wherein said cooling means includes heat conductor element means embedded in a wall zone of said exciter housing.

22. The vibration exciter apparatus according to claim 1, wherein said cooling means includes cooling fan means to cool heat transferred to a position external of said exciter housing.

23. The vibration exciter apparatus according to claim 22, wherein said cooling fan means is carried by at least one driven shaft.

* * * * *